Nov. 13, 1928.  1,691,129
J. B. ROULO
SAFETY DEVICE
Filed June 24, 1927   2 Sheets-Sheet 2

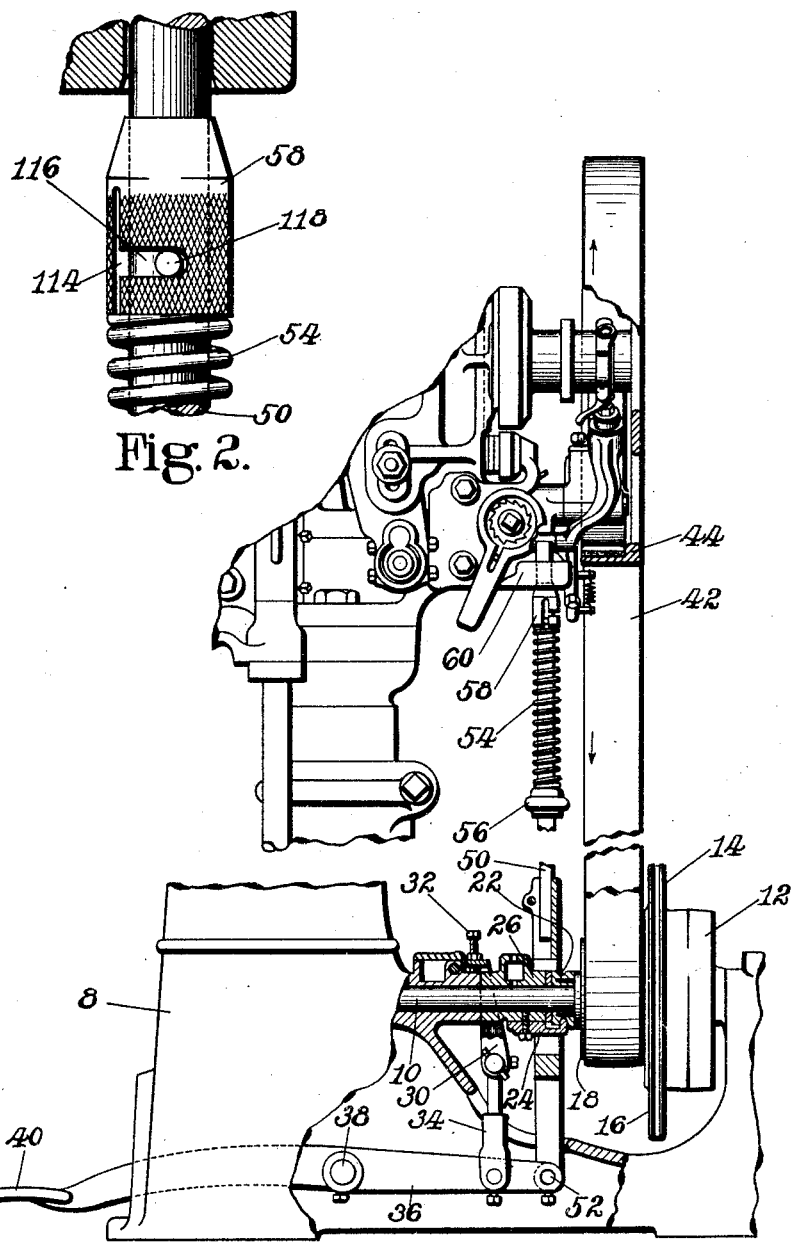

Patented Nov. 13, 1928.

1,691,129

UNITED STATES PATENT OFFICE.

JOHN B. ROULO, OF BEVERLY, MASSACHUSETTS, ASSIGNOR TO UNITED SHOE MACHINERY CORPORATION, OF PATERSON, NEW JERSEY, A CORPORATION OF NEW JERSEY.

SAFETY DEVICE.

Application filed June 24, 1927. Serial No. 201,155.

This invention relates to safety devices, and particularly to a device for enabling a clutch-operated, power-driven machine to be safely turned over by hand while the power is on.

In certain machines, such, for example, as a hand method lasting machine of the type disclosed in Letters Patent of the United States No. 584,744, granted June 15, 1897, upon application of Ladd and McFeely, equipped with the stop mechanism disclosed in Letters Patent of the United States No. 1,356,406, granted October 19, 1920, on application of T. H. Seely, it is sometimes necessary, in order to make certain adjustments or repairs, to turn the machine over by hand. While it is possible with such an organization to release, by a slight movement of the treadle, the brake by which the cam shaft is arrested at a predetermined point in its cycle without starting the machine, the treadle, upon further depression, is still operative to start the machine. The machine may, therefore, be accidentally started while adjustments or repairs are being made, with consequent injury to the person who is making them.

Objects of this invention are to provide means for preventing power operation of a power-driven, clutch operated machine at times and afford protection from accidental injury to the person who is working on the machine to make adjustments and repairs. Accordingly, features of the invention consist in means which, while permitting a limited movement of a manually actuated starting mechanism to release the brake, will arrest such movement in time to prevent setting of a clutch to start the machine. As illustrated, the said means is operated manually to put it in the operative or inoperative position. In the illustrated machine a counter shaft is provided on which is a continuously driven pulley carrying a friction disk which cooperates with another disk operatively connected to the main shaft of the machine. Between the main shaft and the machine frame is a brake mechanism arranged to be set by power of the machine at a predetermined point in the operation of the cam shaft. A manually controlled mechanism, illustrated as a treadle, serves, upon depression by the operator, first, to release the brake and then to set the clutch formed by the friction disks to effect operation of the machine. In the illustrated machine embodying this invention, an adjustable stop is provided which, in one position of adjustment, prevents operation of the treadle to engage the friction disks but permits the brake to be released.

In the illustrated machine release of the brake is effected by initial longitudinal upward movement of a rod connected to the treadle final movement of the rod having no effect on the brake but permitting the friction clutch to be set. The stop before referred to is arranged to prevent final movement of the treadle rod without effecting its initial movement and consists of a member provided with two slots, one extending lengthwise of the rod and the other transversely of the rod. The slots cooperate with a pin fixed on the rod which can occupy either the lengthwise slot or the transverse slot. When the pin occupies the transverse slot, the slotted member permits the rod to be moved a short distance only so that release of the brake may be effected but the clutch disks are not, and cannot be, engaged. The machine is therefore free to be turned over by hand without danger, since the treadle cannot be sufficiently depressed to start the machine. To put the machine in condition for operation, it is only necessary to position the member so that the pin occupies the lengthwise slot in the member.

In the drawing,

Fig. 1 is a side elevation, partly in section, of the rear portion of a lasting machine equipped with the present invention;

Fig. 2 is a detail in elevation, partly in section, of parts shown in Fig. 1.

Figure 3:
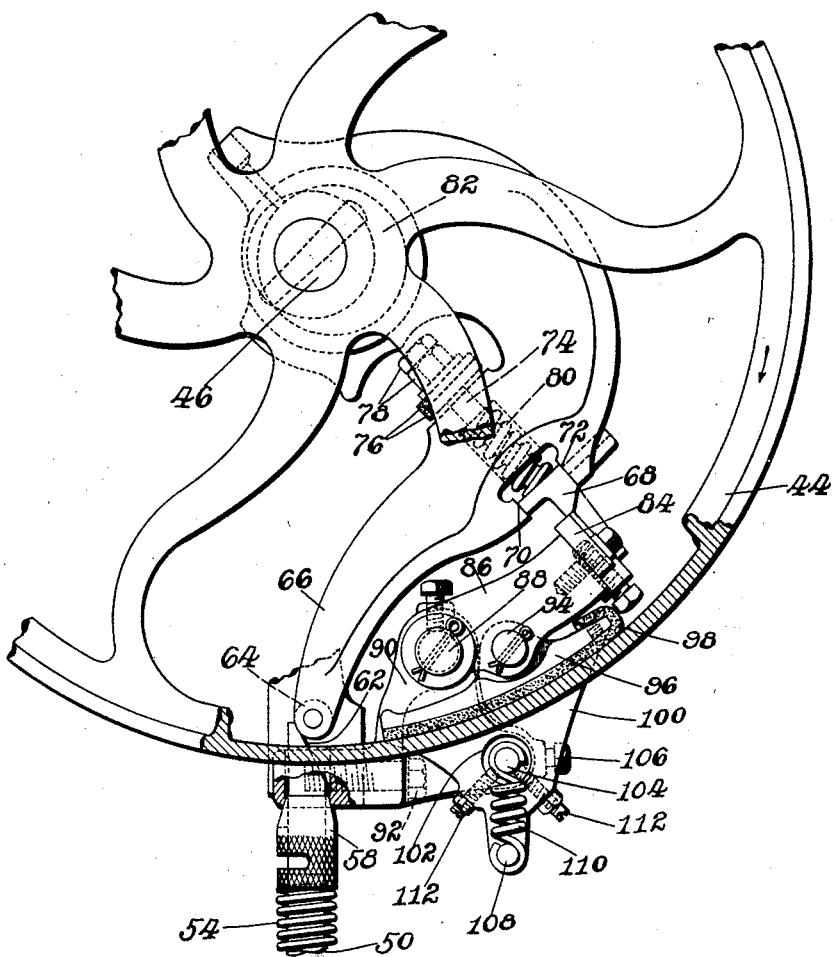
Fig. 3 is a rear view, partly in section, of the stop mechanism shown in Fig. 1.

Referring to Fig. 1, the numeral 8 indicates the base portion and column of the frame of a lasting machine of the type referred to. Mounted in the base portion 8 is a counter shaft 10 carrying a pulley 12 which is continuously driven from any suitable source of power. Fixed to or integral with the pulley 12 is a friction disk 14 with which a similar disk 16 cooperates. The disk 16 is fast to a pulley 18 loosely mounted on the shaft 10 and movable endwise of the shaft to cause the disk 16 to engage and be driven by the disk 14. A hub portion of the pulley 18 has a circumferential groove 22 which is engaged by a clip 24 fastened to a member 26 movable endwise of the shaft 10. Between the forward end of the member 26 and the frame 8 is a bifurcated wedge 30 which, when operated, acts to force the member 26 and the pulley 18 endwise of the shaft to cause engagement with the friction disks 14 and 16. A screw 32 threaded to a portion of the wedge limits the downward movement of the wedge by engagement with the frame, and the lower end of the wedge is connected by a link 34 to a treadle lever 36 pivoted at 38 to the frame. Depression of a treadle 40 on the lever 38 acts to raise the wedge and set the friction clutch comprising the disks 14 and 16. The pulley 18 is connected by a belt 42 to a pulley 44 on a main shaft 46 mounted in the head of the machine.

The shaft 46 is stopped at a predetermined point in its rotation by mechanism best shown in Fig. 3. This mechanism is controlled by a rod 50 connected at 52 to the treadle lever 36 so as to be moved upwardly endwise by depression of the treadle against a spring 54 mounted on the rod 50 between a fixed collar 56 and a sleeve 58 loose on the rod and having a conical upper end which seats in a hole in a part 60 of the frame. The conical end serves to hold the rod 50 centrally of the hole. When the rod is lifted by depression of the treadle an inclined face 62 formed on the upper end of the rod acts on a roll 64 on the lower end of a member 66 mounted on the shaft 46 of the machine to swing toward the right in Fig. 3. Mounted on the member 66 for movement radially of the pulley 44 is a detent block 68. The block is guided between the surfaces 70, 72 formed on the member 66 and has a stem 74 guided through the member 66 and having on its inner end washers 76 and nuts 78. Upon the stem 74, between the member 66 and the block 68, is a stiff spring 80. The portion of the member 66 which is mounted on the main shaft 46 embraces an eccentric 82 pinned on the shaft. The member 66 therefore constitutes an eccentric strap. The eccentric, when in the position shown, has rocked the member 66 about the roll 64 as a fulcrum and forced the outer end of the detent block 68 against a plate 84 which is adjustably held to one end of a lever 86 fulcrumed at 88 on a bracket 90 attached to the frame of the machine by a screw 92. The plate 84 is arranged for adjustment radially of the pulley 44. Pivoted to the lever 86 between its ends at 94 is a brake shoe 96 having a lining 98 of leather or other suitable material. The brake shoe has a downwardly extending portion 100 having an opening 102 which loosely receives a pin 104 fixed to the bracket 90 by a set-screw 106. The portion 100 carries a pin 108 between which and the pin 104 is arranged a tension spring 110 to lift the brake shoe when the opposition of the stiffer spring 80, acting through the detent 18, is released. Stop screws 112 are provided on the portion 100 to engage the pin 104 and determine the position of the brake shoe when released, the screws being preferably adjusted so that the ends of the brake shoe will be equally spaced from the rim of the pulley 44.

The adjustments are such that when the rod 50 is raised by depression of the treadle 40 to start the machine, the inclined face 62 will first act on the roll 64 to swing the member 66 to the right (Fig. 3), causing the detent 68 to release the plate 84 and allowing the spring 110 to lift the brake shoe, and then further movement of the treadle will effect sufficient movement of the wedge 30 to engage the friction disks 14 and 16 and cause the cam shaft 46 to be driven.

By this invention means is provided for enabling the first or initial movement of the treadle to be effected to release the brake so that the main shaft 46 can be turned over by hand while preventing the second or final movement of the treadle to effect setting of the clutch to drive the main shaft. This permits turning the machine over by hand when making adjustments or repairs without danger of power operation and attendant risk or injury to the operator. For this purpose the sleeve 58 (Fig. 2) is provided with two slots, a vertical slot 114 extending lengthwise of the rod 50 and a transverse slot 116 arranged at right angles to the slot 114. Either of the slots 114 and 116 is adapted to receive a pin 118 fixed to the rod 50. Normally the slot 114 is positioned to receive the pin 118, the slot 114 being long enough so as not to interfere with the movement of the rod 50 in the normal operation of the machine. The pin 118 and the slot 116 are relatively located vertically so that, in order to cause the slot 116 to engage a pin 118, the sleeve must be depressed slightly against the tension of the spring 54 and turned on the shaft 50. When the sleeve is thus located, sufficient initial movement of the rod 50 by the treadle is permitted to cause the member 66 to swing to the right (Fig. 3) far enough to release the detent block 68 from the plate 84 and permit the spring 110 to lift the brake shoe 96, thus releasing the brake, but when this has been effected further movement of the treadle is impossible because the rod 50, pin 118, sleeve 58 and the frame 60 form a rigid stop for the treadle. The friction clutch 14 16 therefore cannot be operated and it is perfectly safe for the operator to make adjustments or repairs upon the head of the machine without any danger of the machine being operated accidentally or otherwise while he is so engaged.

Having thus described my invention, what I claim as new and desire to secure by Letters Patent of the United States is:

1. In a machine of the class described, the combination of a main shaft, a counter shaft, a clutch on the counter shaft for controlling the transmission of power to the main shaft, a power-operated brake for arresting movement of the main shaft when the clutch is released, a treadle for operating the clutch, means operated by the treadle for releasing the brake, and an adjustable stop adapted in one position of adjustment to prevent operation of the treadle to set the clutch while permitting the brake-releasing means to be operated.

2. In a machine of the class described, the combination of a main shaft, a counter shaft, a clutch on the counter shaft for controlling the transmission of power to the main shaft, a power operated brake for arresting movement of the main shaft when the clutch is released, a treadle for operating the clutch, a rod operated by the treadle for releasing the brake, a projection on said rod, and an adjustable stop comprising a sleeve having slots at right angles to each other adapted to engage the projection on the rod, adjustment of the sleeve to cause the projection to engage one of the slots permitting operation of the machine as usual, and adjustment of the sleeve to cause the prejection to engage the other slot permitting the brake to be released and preventing operation of the treadle to set the clutch.

3. In a machine of the class described, a main shaft, a counter shaft, a friction clutch mounted on the counter shaft for controlling transmission of power to the main shaft, a power-operated brake for arresting movement of the main shaft when the friction clutch is released, a treadle for operating the friction clutch, a rod arranged for longitudinal movement by the treadle and operating initially to release the brake, the final movement of the rod by the treadle permitting the friction clutch to be set, and means on the rod for preventing final movement thereof to permit the main shaft of the machine to be turned over by hand without danger of accidental operation of the machine by power.

4. In a machine of the class described, a main shaft, a counter shaft, a friction clutch mounted on the counter shaft for controlling transmission of power to the main shaft, a power-operated brake for arresting movement of the main shaft when the friction clutch is released, a treadle for operating the friction clutch, a rod arranged for longitudinal movement by the treadle and operating initially to release the brake, the final movement of the rod by the treadle permitting the friction clutch to be set, a sleeve loose on the rod and having a slot extending transversely of the rod, a pin on the rod adapted to engage the slot in the sleeve, the sleeve, when the slot is engaged by the pin, being located to engage a fixed part of the machine and prevent final movement of the rod.

5. In a machine of the class described, a main shaft, a counter shaft, a friction clutch mounted on the counter shaft for imparting transmission of power to the main shaft, a power-operated brake for arresting movement of the main shaft when the friction clutch is released, a treadle for operating the friction clutch, a rod arranged for longitudinal movement by the treadle and operating initially to release the brake, the final movement of the rod by the treadle permitting the friction clutch to be set, a sleeve loose on the rod and having two slots one extending lengthwise of the rod and the other transversely of it, a collar fast on the rod, a spring on the rod between the collar and the sleeve acting normally to hold the sleeve against the frame and the treadle elevated, and a pin on the rod located normally in the lengthwise slot and below the transverse slot, the sleeve being depressible against the spring and rotatable on the rod to cause the transverse slot to engage the pin, the sleeve then constituting a stop to prevent final movement of the rod while permitting its initial movement.

In testimony whereof I have signed my name to this specification.

JOHN B. ROULO.